(12) United States Patent
Craig

(10) Patent No.: US 7,201,699 B2
(45) Date of Patent: Apr. 10, 2007

(54) FACE GEAR PLANETARY ASSEMBLY

(75) Inventor: Gary A Craig, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 135 days.

(21) Appl. No.: 10/972,126

(22) Filed: Oct. 22, 2004

(65) Prior Publication Data

US 2006/0089229 A1    Apr. 27, 2006

(51) Int. Cl.
*F16H 57/08* (2006.01)

(52) U.S. Cl. ...................................... 475/336
(58) Field of Classification Search ................ 475/336
See application file for complete search history.

(56) References Cited

U.S. PATENT DOCUMENTS

| | | | | |
|---|---|---|---|---|
| 5,135,442 A | * | 8/1992 | Bossler, Jr. | 475/1 |
| 5,456,640 A | * | 10/1995 | Petersen | 475/330 |
| 5,807,202 A | * | 9/1998 | Sammataro | 475/336 |
| 5,862,706 A | * | 1/1999 | Chen et al. | 74/411 |
| 6,428,443 B1 | * | 8/2002 | Dischler | 475/343 |

* cited by examiner

*Primary Examiner*—Dirk Wright
(74) *Attorney, Agent, or Firm*—Harness, Dickey & Pierce, P.L.C.

(57) ABSTRACT

A high power, high speed gearbox including a compound face gear planetary gear assembly (FGPGA) is provided. The FGPGA includes a first planetary gear set (PGS1) and a second planetary gear set (PGS2). The PGS1 includes a spur gear connected to an input shaft, a plurality of intermediate pinion gears, a first face gear and a second face gear oriented in a planetary arrangement. The PGS2 includes a plurality of gears oriented in a planetary arrangement and operate to turn an output shaft. The PGS1 first and second face gears are configured to engage the spur gear such that the input shaft can have angle of other than 90° with respect to the output shaft. By implementing the PGS1 face gears in a planetary arrangement with the spur gear and the intermediate pinion gears, the rotational direction of the output shaft can be altered by changing a tooth differential between the PGS1 first and second face gears without employing an idler gear in the PGS1.

26 Claims, 4 Drawing Sheets

FACE GEAR PLANETARY ASSEMBLY

FIELD OF THE INVENTION

The present invention relates to gear arrangements, and more particularly, to a face gear planetary assembly arrangement.

BACKGROUND OF THE INVENTION

In known high power, high speed gearbox applications, such as transmission gearboxes for helicopters, typically planetary gear sets are utilized. Generally, planetary gear sets utilized in these applications have straight, in-line input and output axes. Therefore, to have an output that is not in-line with the input different gear sets must be employed to alter the direction of the output with respect to the input direction. Additionally, to achieve low speed outputs from high speed inputs, significant gear reduction ratios are needed that require various stages of gears to be incorporated within the gearbox. Furthermore, to alter the direction of output of gearboxes utilizing planetary gear sets, additional idler gears need to be added. These additional gears and/or gear sets significantly increase the complexity, weight and manufacturing and repair costs for such high speed planetary gear set gearboxes.

Face gears are currently used for many applications throughout industry. However, face gears are typically implemented in low power, low speed applications. For example, face gears are commonly utilized in cement mixer trucks that use higher strength course tooth face gears to turn the large barrels; satellite applications that incorporate large diameter fine tooth face gears for precise indexing of equipment; and large ship propeller drives. Inexpensive nylon face gears are also being used in commercial items such as fertilizer spreaders. Recently, attempts have been made to utilize face gears in high power, high speed power transmission applications. However, typically the use of face gears in such high power, high speed applications has been limited by such things as the complexity of employing off-line input/output axes angles other than 90° and the general necessity to incorporate additional idler gears to change the rotational direction of the output.

Therefore, it is desirable to provide a gearbox incorporating a high power, high speed gear set that will allow for off-axes input/output implementations, provide high input/output gear ratios and provide the capability to change the rotational direction of the output while minimizing the number of parts and, thereby, significantly reducing the cost of manufacturing and repair of such gearboxes.

SUMMARY OF THE INVENTION

Generally, gearboxes, e.g. transmissions, that incorporate planetary gear sets, include a sun gear, a planet gear and a ring gear. The power transmission method and gearbox of the present invention incorporate a planetary gear set that includes a first face gear, a second face gear and a plurality of pinion gears.

In a preferred embodiment of the present invention, a high power, high speed gearbox is provided. The gearbox includes a compound face gear planetary gear assembly that includes a first planetary gear set (PGS1) and a second planetary gear set (PGS2). The PGS1 includes a spur gear connected to an input shaft, a plurality of intermediate pinion gears, a first face gear and a second face gear oriented in a planetary arrangement. The PGS2 includes a ring gear, a sun gear and a plurality of planet pinion gears oriented in a planetary arrangement. The planet gears are rotationally connected to a carrier that is coupled to an output shaft. The PGS1 first and second face gears are configured to engage the spur gear such that the input shaft can have angle of other than 90° with respect to the output shaft. By implementing the PGS1 face gears in a planetary arrangement with the spur gear and the intermediate pinion gears, the rotational direction of the output shaft can be altered by changing a tooth differential between the PGS1 first and second face gears without employing an idler gear in the PGS1.

In another preferred embodiment, the ring gear is a PGS2 first face gear and the sun gear is a PGS2 second face gear oriented in a planetary arrangement with the planet pinion gears. The rotational direction of the output shaft can therefore also be altered by changing a tooth differential between the PGS2 first and second face gears without employing an idler gear in the PGS2. Therefore, the rotational direction of the output shaft can be changed from clockwise to counter-clockwise, and vice-versa, by changing the tooth differential between the PGS1 first and second face gears, or by changing the tooth differential between the PGS2 first and second face gears, or changing the tooth differentials in both the PGS1 and PGS2, without employing an idler gear in the face gear planetary gear assembly.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1A:
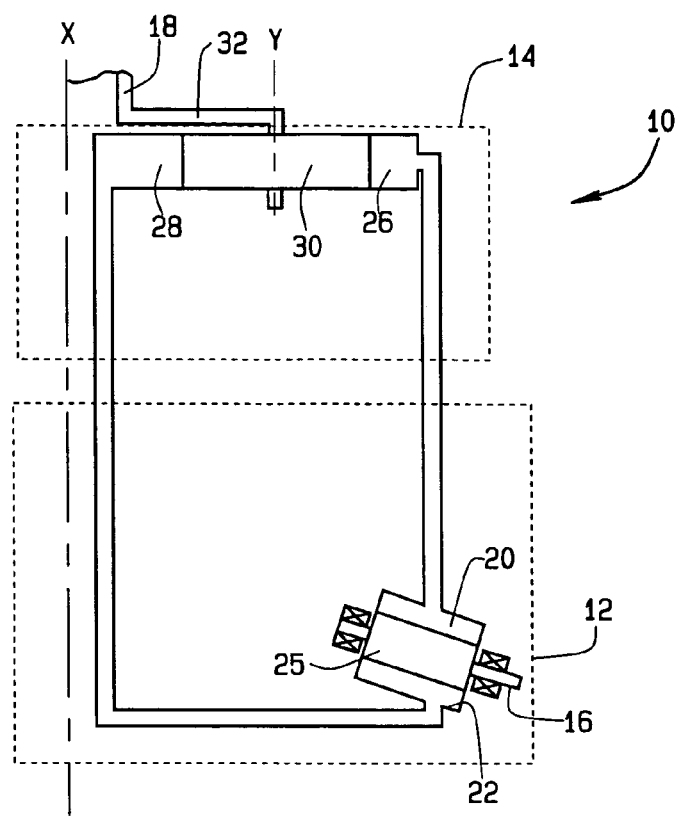
FIG. 1A is an illustration of one-half of a cross-section of a face gear planetary gear assembly constructed in accordance with a preferred embodiment of the present invention.
Figure 1B:
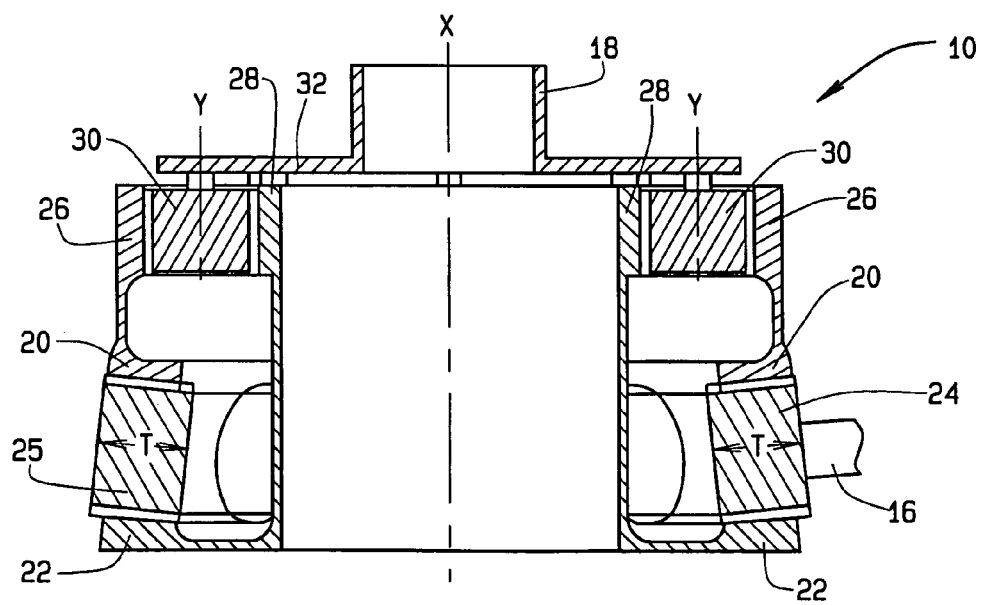
FIG. 1B is a cross-sectional view of the face gear planetary gear assembly illustrated in FIG. 1A.

With reference to FIGS. 1A and 1B, a face gear planetary gear assembly 10 is illustrated in accordance with a preferred embodiment of the present invention. The face gear planetary gear assembly (FGPGA) 10 includes a first planetary gear set 12 connected to a second planetary gear set 14, shown in FIG. 1A. The first planetary gear set 12 and the second planetary gear set 14 are respectively referred to herein as PGS1 12 and PGS2 14. Thus, the (FGPGA) 10 can be referred to as a compound face gear planetary gear assembly. An input shaft 16 is associated with the PGS1 12 and an output shaft 18 is associated with the PGS2 14. Rotation of the input shaft 16 from power provided by a motor or other such device (not shown) is transferred to the PGS1 12, which in turn causes the PGS2 set 14 to rotate, thereby causing the output shaft 18 to rotate. As described in detail below, physical characteristics of face gears included in the PGS1 12 and the PGS2 14, e.g. the number of teeth in each gear, affect an input/output gear ratio and a rotational direction of the output shaft 18. Particularly, the rotational direction of the output shaft 18 can be altered by merely changing the number of teeth of the face gears without employing additional gears, e.g. an idler gear. Additionally, as described in detail below, the face gears included in PGS1 12, allow the input shaft 16 to have an angular orientation with respect to the output shaft 18 of approximately 0° to 180°.

In accordance with a preferred implementation of the present invention, the PGS1 12 includes a first face gear 20 (referred to herein as PGS1 first face gear 20), a second face gear 22 (referred to herein as PGS1 second face gear 22), a spur gear 24 and a plurality of intermediate pinion gears 25, shown in FIG. 1B. The number of intermediate pinion gears 25 can be determined based on a desired amount of torque distribution via tooth sharing. That is, the greater the number of intermediate pinion gears 25 included in the PGS1,the greater the distribution of torque between the teeth of the intermediate pinion gears 25 and the PGS1 first and second face gears 20 and 22. The PGS1 first face gear 20 and the PGS1 second face gear 22 are cooperative through the spur gear 24. Thus, the spur gear 24 and the PGS1 first and second face gears 20 and 22 are configured in a planetary arrangement. The input shaft 16 is coupled to the spur gear 24. The intermediate pinion gears 25 include bearings (not shown) and are rotationally connected to a housing (not shown) of the (FGPGA) 10. The intermediate pinion gears 25 are positioned between, and mate with, the PGS1 first and second face gears 20 and 22 around a circumference of the PGS1 first and second face gears 20 and 22.

The PGS2 14 includes a ring gear 26, a sun gear 28, and a plurality of planet pinion gears 30. The ring gear 26 and the sun gear 28 operate to drive the planet pinion gears 30. The planet pinion gears 30 are rotationally coupled to a carrier 32 that is connected to the output shaft 18. The PGS1 first face gear 20 is connected with the ring gear 26 and the PGS1 second face gear 22 is connected with the sun gear 28. The PGS1 first and second face gears 20 and 22 can be connected to the ring and sun gears 26 and 28 in any suitable manner, based on the various preferred embodiments described herein. For example, the PGS1 first and second face gears 20 and 22 can be splined with the ring and sun gears 26 and 28, or the PGS1 first and second face gears 20 and 22 can be connected with the ring and sun gears 26 and 28 using nut and bolt connectors. Alternatively, the PGS1 first face gear 20 and the ring gear 26 can be fabricated as a single component and/or the PGS1 second face gear 22 and the sun gear 28 can be fabricated as a single component. As further described below, the rotation of the ring and sun gears 26 and 28 in opposite directions around an axis X of the (FGPGA) 10 causes the planet pinion gears 30 and the shaft 18 to rotate around the axis X in either a clockwise or counter-clockwise direction, based on a tooth differential between the PGS1 first and second face gears 20 and 22.

Rotation of input shaft 16 rotates the spur gear 24, which in turn rotates the PGS1 first face gear 20 in a first direction and rotates the PGS1 second face gear 22 in a second direction that is opposite the first direction. The ring gear 26 is connected to the PGS1 first face gear 20 and therefore, also rotates in the first direction. Similarly, the sun gear 28 is connected to the PGS1 second face gear 22 and therefore, also rotates in the second direction. Accordingly, rotation of the ring gear 26 and the sun gear 28 in opposite directions rotates the output shaft 18. In order to obtain a high gear reduction ratio between the input 16 and the output 18, any or all of the PGS1 first face gear 20, the PGS1 second face gear 22, the spur gear 24, the ring gear 26, the sun gear 28 and/or the planet gears 30 can be designed/manufactured to have a specific number of teeth such that the FGPGA 10 produces a desired gear ratio. Preferably, the number of teeth in the sun gear 28 is similar, but not the same as the number of teeth in the ring gear 26. This allows the PGS2 14 to include a greater number of planet gears 30 between the ring and sun gears 26 and 28. Moreover, the strength of the sun gear 28 is increased in this configuration because the force on each tooth is less due to a bigger moment arm generated by a bigger radius for a given torque.

Since the PGS1 12 includes the PGS1 first and second face gears 20 and 22 configured in a planetary gear set arrangement, the input shaft 16 can be offset from the output shaft 18 at an angle other than 90°, as shown in FIG. 1B. More specifically, the input shaft 16 can have an angle with respect to the output shaft 18, between approximately 0° and 180°. For example, as illustrated in FIG. 1B, the input shaft 16 can be angled at an angle of approximately 80° with respect to the output shaft 18, although any angle may be employed. In this configuration, the input shaft 16 enters the side of the (FGPGA) 10.

In this embodiment, the rotational direction of the output shaft 18 can be changed by altering the tooth differential between the PGS1 first face gear 20 and the PGS1 second face gear 22. Particularly, the rotational direction of the output shaft 18 can be altered by merely changing the number of teeth of the PGS1 first and second face gears 20 and 22 without employing additional gears, e.g. an idler gear. For example, if the PGS1 first face gear 20 has a greater number of teeth than the PGS1 second face gear 22, rotation of the input shaft will cause the spur gear to drive the PGS1 first face gear 20 at a slower rate of speed around the axis X than the PGS1 second face gear 22. Accordingly, via the connection between the PGS1 first face gear 20 and the ring gear 26 and the connection between the PGS1 second face gear 22 and the sun gear 28, the ring gear 26 will likewise rotate around the axis X at a slower rate than the sun gear 28. This will cause the teeth of the planet gears 30 that engage the ring gear 26 to be driven around an axis Y of the planet gears 30 at a slower rate than the teeth of the planet gears 30 that engage the sun gear 28. Therefore, the planet gears 30 will travel around the axis X in the same direction that the sun gear 28 is rotating around the axis X, which will thereby cause the output shaft 18 to rotate in the same direction as the sun gear 28.

Conversely, if the PGS1 first face gear 20 included fewer teeth than the second PGS1 face gear 22, the ring gear 26 would rotate around the axis X at a faster rate of speed than the sun gear 28. This would cause the teeth of planet gears 30 that engage the ring gear 26 to rotate around the axis Y at a faster rate of speed than the teeth of the planet gears 30 that engage the sun gear 28. Therefore, the planet gears 30 travel around the axis X in the same direction as the ring gear 26 rotates around the axis X. Thus, the output shaft will have the same rotational direction around the axis X as the ring gear 26.

By utilizing face gears in the PGS1 14, i.e. PGS1 first and second face gears 20 and 22, altering the number of teeth included in each of the PGS1 first and second face gears 20 and 22 merely changes a radius of the respective gear. As illustrated in FIG. 1B, the PGS1 first face gear 20 has larger radius than the PGS1 second face gear 22; therefore, the PGS1 first face gear 20 has a greater number of teeth and accordingly, the output shaft 18 will rotate in the same rotational direction as the sun gear 28. To accommodate radial differences between the PGS1 first and second face gears 20 and 22, a thickness T of the spur gear 24 and intermediate pinion gears 25 will need to have a dimension adequate to fully engage the teeth of both the PGS1 first and second gears 20 and 22. Providing the capability for the input shaft 16 to enter the FGPGA 10 at angles other than 90°, with respect to the output shaft 18, allows the thickness T of the spur gear 24 and the intermediate pinion gears 25 to be smaller and still accommodate the radial difference between the PGS1 first and second face gears 20 and 22. This will greatly reduce the part cost and weight of the FGPGA 10.

Figure 2A:
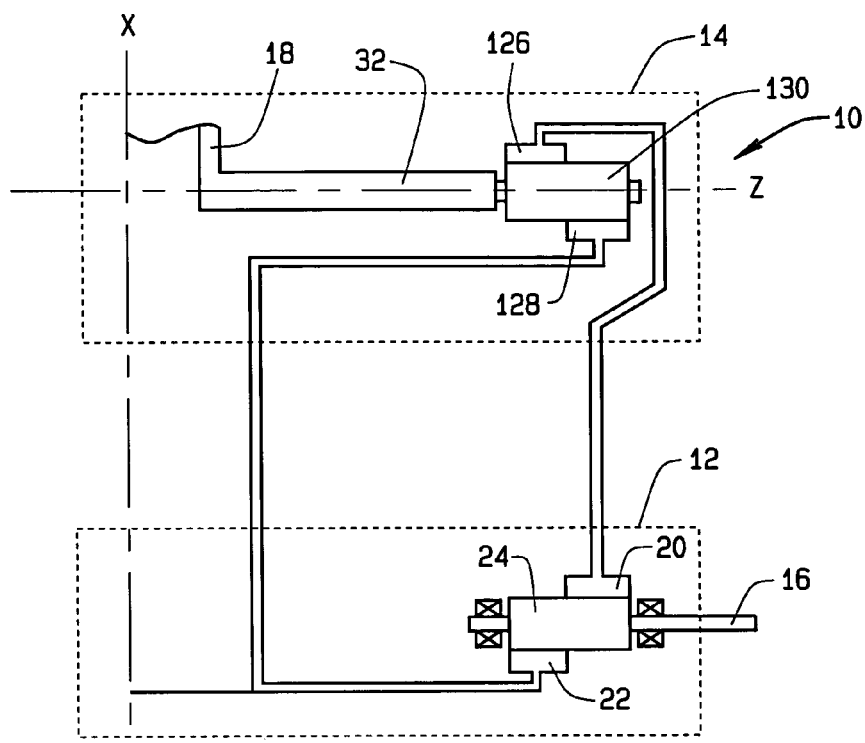
FIG. 2A is an illustration of one-half of a cross-section of a face gear planetary gear assembly constructed in accordance with an alternated preferred embodiment of the present invention.
Figure 2B:
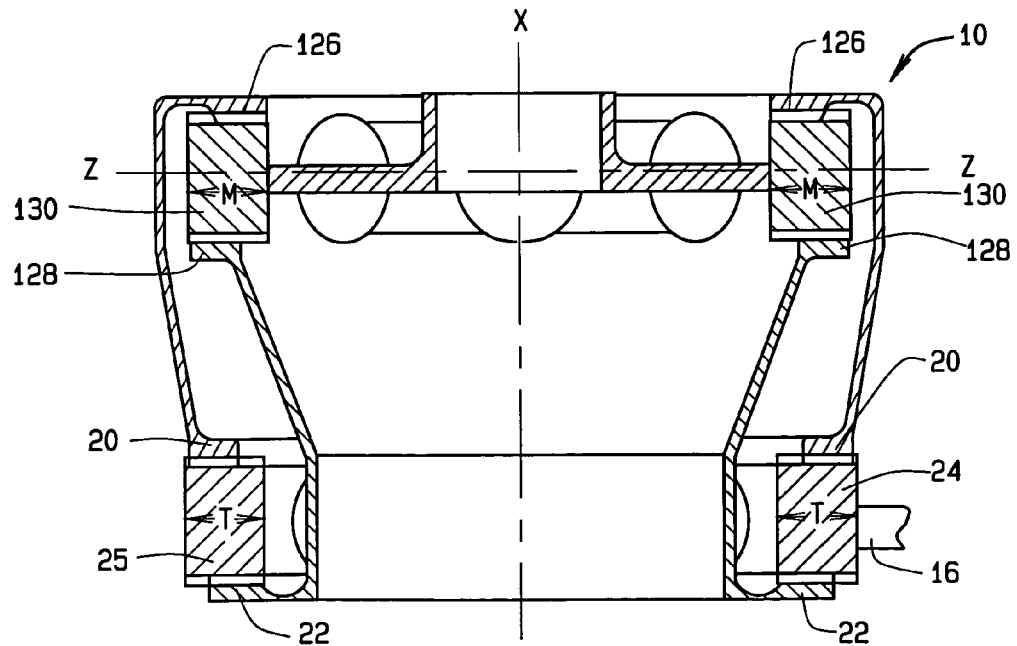
FIG. 2B is a cross-sectional view of the face gear planetary gear assembly illustrated in FIG. 2A.

FIGS. 2A and 2B illustrate the FGPGA 10 in accordance with an alternate preferred embodiment of the present invention. Components illustrated in FIGS. 2A and 2B that are the same as parts illustrated in FIGS. 1A and 1B are identified in FIGS. 2A and 2B with like referenced numerals. In this embodiment, the PGS2 14 includes a first face gear 126 (referred to herein as PGS2 first face gear 126), a second face gear 128 (referred to herein as PGS2 second face gear 128), and a plurality of pinion gears 130. The number of pinion gears 130 can be determined based on a desired amount of torque distribution via tooth sharing. That is, the greater the number of pinion gears 130 included in the PGS2, the greater the distribution of torque between the teeth of the pinion gears 130 and the PGS2 first and second face gears 126 and 128. Thus, the PGS2 14 includes the PGS2 first and second face gears 126 and 128 configured in a planetary arrangement with the pinion gears 130. The output shaft 18 is coupled to the pinion gears 130 via the carrier 32. The PGS1 first face gear 20 is connected to the PGS2 first face gear 126 and the PGS1 second face gear 22 is connected to the PGS2 second face gear 128.

The PGS1 first and second face gears 20 and 22 can be connected to the PGS2 first and second face gears 126 and 128 in any suitable manner based on the various preferred embodiments described herein. For example, the PGS1 first and second face gears 20 and 22 can be splined with the PGS2 first and second face gears 126 and 128, or the PGS1 first and second face gears 20 and 22 can be connected with the PGS2 first and second face gears 126 and 128 using nut and bolt connectors. Alternatively, the PGS1 first face gear 20 and the PGS1 first face gear 216 can be fabricated as a single component and/or the PGS1 second face gear 22 and the PGS2 second face gear 128 can be fabricated as a single component. As set forth above, rotation of the input shaft 16 from power provided by a motor or other such device (not shown) is transferred to the PGS1 12, which in turn causes the PGS2 set 14 to rotate, thereby causing the output shaft 18 rotate. Particularly, the rotation of the PGS2 first and second face gears 126 and 128 in opposite directions around an axis X of the (FGPGA) 10 causes the pinion gears 130 to rotate around an axis Z and simultaneously to travel around the axis X. The movement of the pinion gears 130 around the axis X causes the shaft 18 to rotate around the axis X in either a clockwise or counter-clockwise direction. As described below, the direction of rotation is based on the tooth differential between the PGS1 first and second face gears 20 and 22 and/or the tooth differential between the PGS2 first and second face gears 126 and 128.

More particularly, rotation of input shaft 16 rotates the spur gear 24, which in turn rotates the PGS1 first face gear 20 in a first direction and rotates the PGS1 second face gear 22 in a second direction that is opposite the first direction. The PGS2 first face gear 126 is connected to the PGS1 first face gear 20 and therefore, also rotates in the first direction. Similarly, the PGS2 second face gear 128 is connected to the PGS1 second face gear 22 and therefore, also rotates in the second direction. Accordingly, rotation of the PGS2 first and second face gears 126 and 128 in opposite directions rotates the output shaft 18. In order to obtain a high gear reduction ratio between the input 16 and the output 18, the tooth count of any or all of the PGS1 first face gear 20, the PGS1 second face gear 22, the PGS2 first face gear 126, the PGS2 second face gear 128, the pinion gears 130 and/or the spur gear 24 can be specified such that the FGPGA 10 produces a desired gear ratio.

As set forth above with reference to FIGS. 1A and 1B, utilizing the PGS1 first and second face gears 20 and 22 configured in a planetary gear set arrangement, the input shaft 16 can be offset from the output shaft 18 at an angle other than 90°. More specifically, the input shaft 16 can have an angle with respect to the output shaft 18, between approximately 0° and 180°.

In this embodiment, the rotational direction of the output shaft 18 can be changed by altering the tooth differential between the PGS1 first face gears 20 and 22 and/or by altering the tooth differential between the PGS2 first and second face gears 126 and 128. Particularly, the rotational direction of the output shaft 18 can be altered by merely changing the number of teeth of the PGS1 first and second face gears 20 and 22 and/or the number of teeth of the PGS2 first and second face gears 126 and 128, without employing additional gears, e.g. an idler gear. For example, if the PGS1 first face gear 20 has a greater number of teeth than the PGS1 second face gear 22, rotation of the input shaft will cause the spur gear to drive the PGS1 first face gear 20 at a slower rate of speed around the axis X than the PGS1 second face gear 22. Therefore, via the connection between the PGS1 first face gear 20 and the PGS2 first face gear 126, the PGS2 first face gear 126 will rotate around the axis X in the same direction as the PGS1 first face gear 20. Likewise, via the connection between the PGS1 second face gear 22 and the PGS2 second face gear 128, the PGS2 second face gear 128 will rotate around the axis X in the same direction as the PGS1 second face gear 22. Accordingly, the PGS2 first face gear 126 will rotate around the axis X at a slower rate than the PGS2 second face gear 128.

This will cause the teeth of the pinion gears 130 that engage the PGS2 first face gear 126 to be driven around an axis Z at a slower rate than the teeth of the pinion gears 130 that engage the PGS2 second face gear 128. Therefore, the pinion gears 130 will travel around the axis X in the same direction that the PGS2 second face gear 128 and the PGS1 second face gear 22 are rotating around the axis X. This, in turn, will cause the output shaft 18 to also rotate in the same direction as the PGS2 second face gear 128 and the PGS1 second face gear 22. Conversely, if the PGS1 first face gear 20 included fewer teeth than the second PGS1 second face gear 22, the PGS2 first face gear 126 would rotate around the axis X at a faster rate of speed than the PGS2 second face gear 128. Therefore, the pinion gears 130 would travel around the axis X, and the output shaft 18 would rotate in the same direction as the PGS2 first face gear 126 and the PGS1 first face gear 20.

Alternatively, if the PGS1 first and second face gears 20 and 22 included the same number of teeth, but the PGS2 first face gear 126 had fewer teeth than the PGS2 second face gear 128, the output shaft 18 would rotate in the same direction as PGS2 first face gear 126 and PGS1 first face gear 20. Specifically, the teeth of the pinion gears 130 that engage the PGS2 first face gear 126 would be driven around the axis Z at a faster rate than the teeth of the pinion gears 130 that engage the PGS2 second face gear 128. This would cause the pinion gears 130 to travel around the axis X, and the output shaft 18 to rotate, in the same direction as the PGS2 first face gear 126 and the PGS1 first face gear 20 rotate around the axis X.

Further yet, the FGPGA 10 could be constructed such that there was a tooth differential between the PGS1 first and second face gears 20 and 22 and a tooth differential between the PGS2 first and second face gears 126 and 128. Thus, the output gear ratio and the rotational direction and speed of the output shaft 18 can be controlled or set to desirable values by selecting the proper tooth differentials between the face gears implemented in one or both of the PGS1 12 and the PGS2 14.

As described above, altering the number of teeth included in each of the PGS1 first and second face gears 20 and 22 and/or the PGS2 first and second face gears 126 and 128 merely changes a radius of the respective gear. To accommodate the radial differenced between the PGS2 first and second face gears 126 and 128, a thickness M of the pinion gears 130 will preferably have a dimension adequate to fully engage the teeth of both the PGS2 first and second face gears 126 and 128. Likewise, to accommodate the radial differences between the PGS1 first and second face gears 20 and 22, a thickness T of the spur gear 24 and intermediate pinion gears 25 will need to have a dimension adequate to fully engage the teeth of both the PGS1 first and second gears 20 and 22. Additionally, as described above, utilizing face gears in the PGS1 12, i.e. PGS1 first and second face gears 20 and 22, allows the input shaft 16 to have an angular orientation with respect to the output shaft 18 of approximately 0° to 180°. Providing the capability for the input shaft 16 to enter the FGPGA 10 at angles other than 90°, with respect to the output shaft 18, allows the thickness T of the spur gear 24 and the intermediate pinion gears 25 to be smaller and still fully engage the teeth of the PGS1 first and second face gears 20 and 22.

Figure 3A:
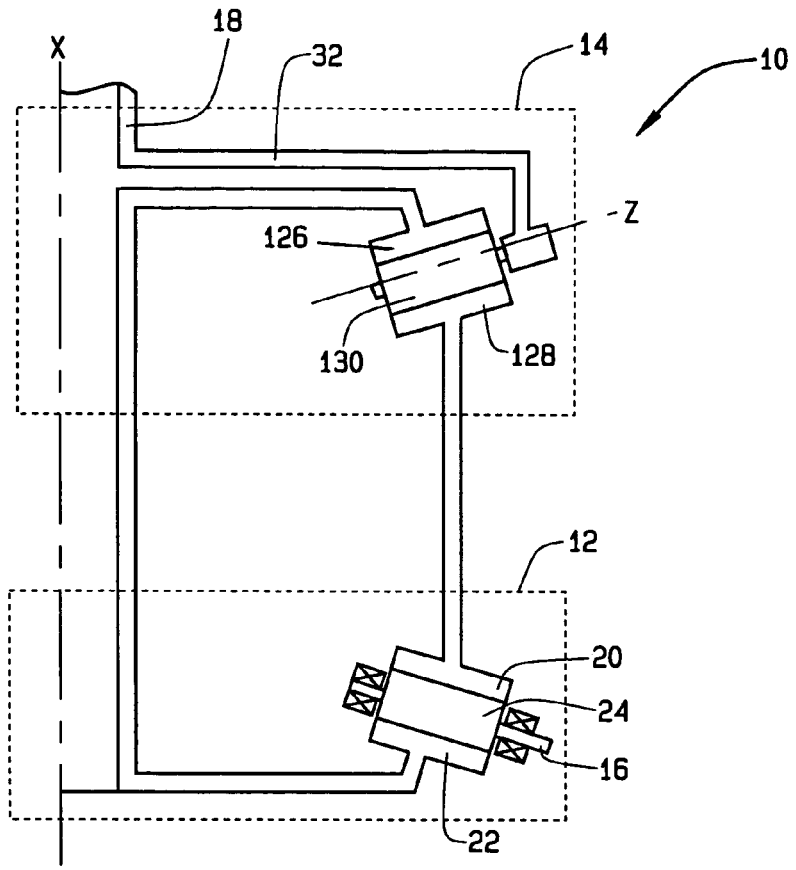
FIG. 3A is an illustration of one-half of a cross-section of a face planetary gear assembly constructed in accordance with another alternated preferred embodiment of the present invention.

FIGS. 3A and B illustrate the FGPGA 10 in accordance with another alternate preferred embodiment of the present invention. Components illustrated in FIG. 3A and 3B that are the same as parts illustrated in FIGS. 2A and 2B are identified in FIGS. 3A and 3B with like referenced numerals. In this embodiment, the PGS1 first face gear 20 is connected to the PGS2 second face gear 128 and the PGS1 second face gear 22 is connected to the PGS2 first face gear 126. Having the PGS1 first face gear 20 connected to the PGS2 second face gear 128 allows separation forces of the PGS1 first face gear 20 to substantially balance with the separation forces of the PGS2 second face gear 128. Particularly, as the teeth of the PGS1 first face gear 20 engage the teeth of the spur gear 24 and intermediate pinion gears 25 there is a force generated that pushes the PGS1 first face gear 20 away from the spur gear 24 and the intermediate pinion gears 25. Similarly, there is a separation force generated between the PGS2 second face gear 128 and the pinion gears 130. Having the PGS1 first face gear 20 connected with the PGS2 second face gear 128 allows these separation forces to substantially balance each other. Likewise, having the PGS1 second face gear 22 connected with the PGS2 first face gear 126 allows the associated separation force to substantially balance each other. This allows the FGPGA 10 to not require additional components (not shown) to counter these separation forces and keep the teeth of the gears engaged.

Figure 3B:
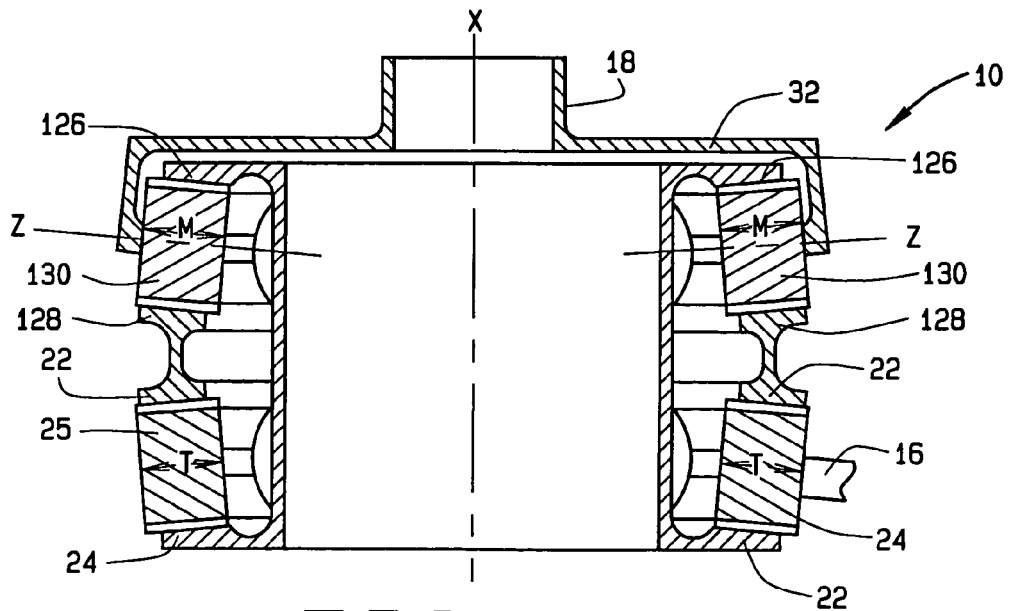
FIG. 3B is a cross-sectional view of the face gear planetary gear assembly illustrated in FIG. 3A.

Generally, the operation of the embodiment of the FGPGA 10 illustrated in FIGS. 3A and 3B is the same as that described above in reference to the embodiment of the FGPGA 10 illustrated in FIGS. 2A and 2B. Particularly, the PGS1 first face gear 20 rotates in a first direction and the PGS1 second face gear 22 rotates in a second direction that is opposite the first direction. However, in this embodiment, the PGS2 second face gear 128 is connected to the PGS1 first face gear 126 and the PGS2 first face gear 126 is connected to the PGS 1 second face gear 126. Therefore, the PGS2 second face gear 128 rotates in the first direction and the PGS2 first face gear 126 rotates in the second direction.

As with the embodiment described above with reference to FIGS. 2A and 2B, the rotational direction of the output shaft 18 can be changed by altering the tooth differential between the PGS1 first and second face gears 20 and 22 and/or by altering the tooth differential between the PGS2 first and second face gears 126 and 128. Particularly, the rotational direction of the output shaft 18 can be altered by merely changing the number of teeth of the PGS1 first and second face gears 20 and 22 and/or the number of teeth of the PGS2 first and second face gears 126 and 128, without employing additional gears, e.g. an idler gear. However, the rotational direction of the output shaft 18 with respect to the embodiment illustrated in FIGS. 3A and 3B will be opposite of the rotational direction of the output shaft 18 described above, in reference to FIGS. 2A and 2B. For example, as described above, if the PGS1 first face gear 20 has a greater number of teeth than the PGS1 second face gear 22, then the PGS1 first face gear 20 will rotate around the axis X at a second speed than the PGS1 second face gear 22. However, because the PGS1 first face gear 20 is connected to the PGS2 second face gear 128, the PGS2 second face gear will rotate around the axis X in the same direction as the PGS1 first face gear 20. Likewise, because the PGS1 second face gear 22 is connected to the PGS2 first face gear 126, the PGS2 first face gear 126 will rotate around the axis X in the same direction as the PGS1 second face gear 22. Accordingly, the PGS2 second face gear 128 will rotate around the axis X at a slower rate than the PGS2 first face gear 126.

This will cause the teeth of the pinion gears 130 that engage the PGS2 second face gear 128 to be driven around the axis Z at a slower rate than the teeth of the pinion gears 130 that engage the PGS2 first face gear 126. Therefore, the pinion gears 130 will travel around the axis X in the same direction as the PGS2 first face gear 126, but in the opposite direction of the PGS1 first face gear 20. This, in turn, will cause the output shaft 18 to also rotate in the same direction as the PGS2 first face gear 126, but in the opposite direction of the PGS1 first face gear 20. Conversely, if the PGS1 first face gear 20 included fewer teeth than the second PGS1 second face gear 22, the PGS2 second face gear 128 would rotate around the axis X at a faster rate of speed than the PGS2 first face gear 126. Therefore, the pinion gears 130 would travel around the axis X, and the output shaft 18 would rotate in the same direction as the PGS2 second face gear 128, but in the opposite direction of the PGS1 second face gear 22.

Alternatively, if the PGS1 first and second face gears 20 and 22 included the same number of teeth, but the PGS2 first face gear 126 had fewer teeth than the PGS2 second face gear 128, the output shaft 18 would rotate in the same direction as PGS2 first face gear 126, but in the opposite direction of the PGS1 first face gear 20.

As described above, altering the number of teeth included in each of the PGS1 first and second face gears 20 and 22 and/or the PGS2 first and second face gears 126 and 128 merely changes a radius of the respective gear. To accommodate the radial difference between the PGS2 first and second face gears 126 and 128, a thickness M of the pinion gears 130 will preferably have a dimension adequate to fully engage the teeth of both the PGS2 first and second face gears 126 and 128. Likewise, to accommodate the radial differences between the PGS1 first and second face gears 20 and 22, a thickness T of the spur gear 24 and intermediate pinion gears 25 will need to have a dimension adequate to fully engage the teeth of both the PGS1 first and second gears 20 and 22. Additionally, as described above, utilizing face gears in the PGS1 12, i.e. PGS1 first and second face gears 20 and 22, allows the input shaft 16 to have an angular orientation with respect to the output shaft 18 of approximately 0° to 180°. This allows the thickness T of the spur gear 24 and the intermediate pinion gears 25 to be smaller and still fully engage the teeth of the PGS1 first and second face gears 20 and 22. Similarly, as illustrated in FIG. 3B, utilizing face gears in the PGS2 14, i.e. PGS2 first and second face gears 126 and 128, allows the pinion gears 130 to have an angular orientation with respect to the output shaft 18 other than 90°. This allows the thickness M of the pinion gears 130 to be smaller and still fully engage the teeth of the PGS2 first and second face gears 126 and 128.

Figure 4A:
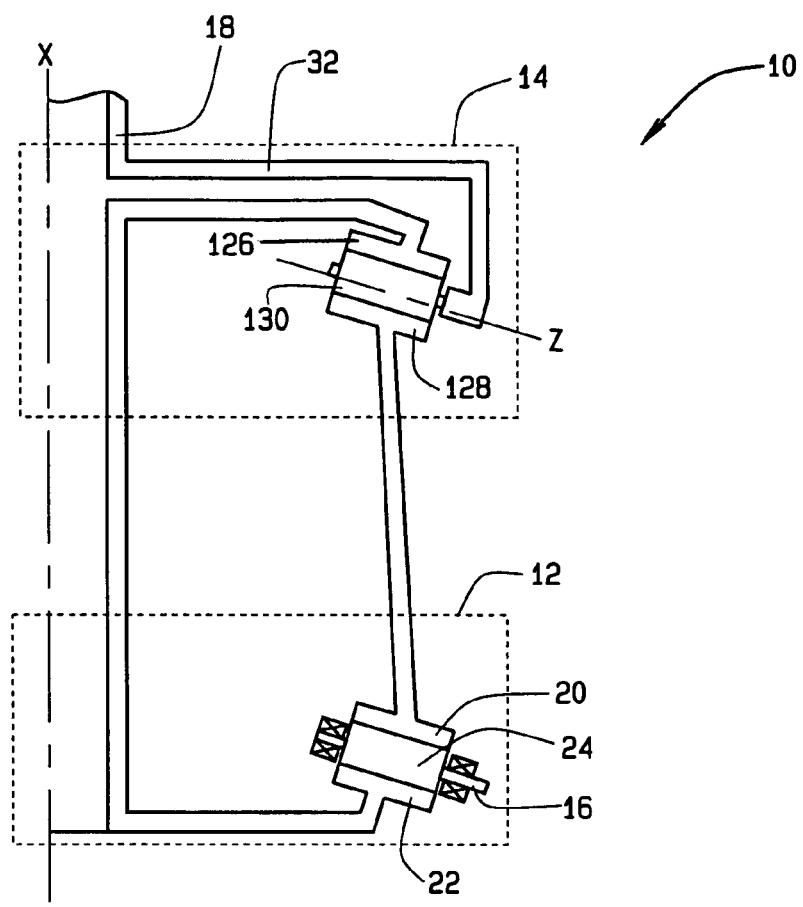
FIG. 4A is an illustration of one-half of a cross-section of a face gear planetary gear assembly constructed in accordance with yet another alternated preferred embodiment of the present invention.
Figure 4B:
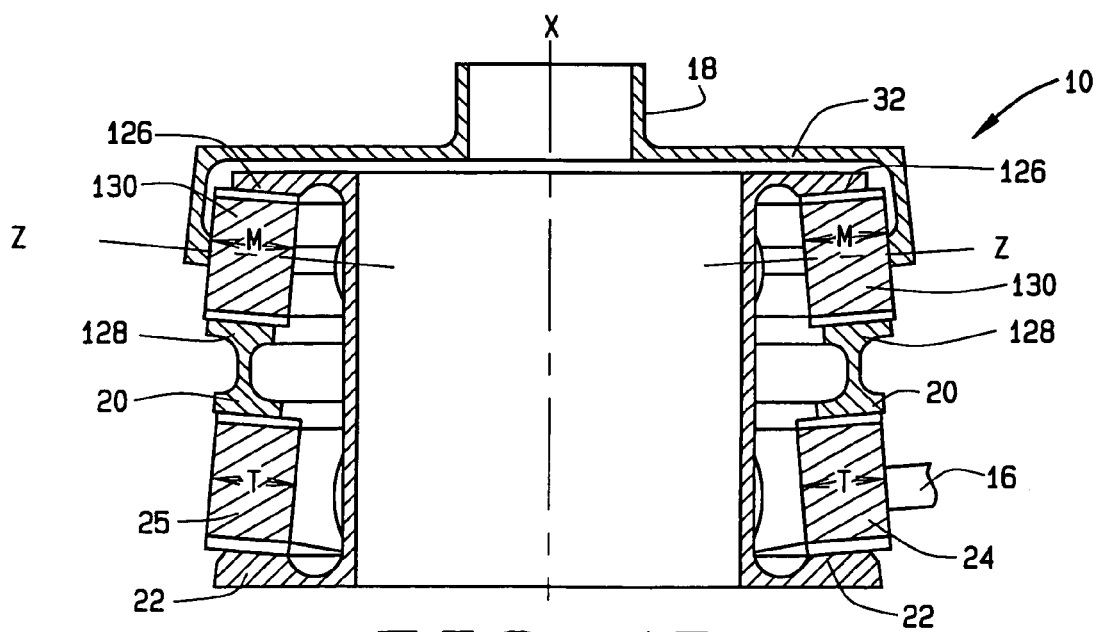
FIG. 4B is a cross-sectional view of the face gear planetary gear assembly illustrated in FIG. 4A.

Referring to FIGS. 4A and 4B, another preferred embodiment is illustrated. This embodiment is substantially the same as the embodiment described above with reference to FIGS. 3A and 3B in form and function. However, FIGS. 3A and 3B illustrate the pinion gears 130 having an angular orientation with respect to the output shaft 18 that is different than that of the spur gear 24 and the intermediate pinion gears 25. The embodiment shown in FIGS. 4A and 4B illustrates a preferred embodiment of the present invention wherein the angular orientation of the pinion gears 130 with respect to the output shaft 18 is parallel to that of the spur gear 24 and the intermediate pinion gears 25.

The FGPGA 10 implements face gears, i.e. the PGS1 and PGS2 face gears 20, 22, 126 and 128, in a planetary arrangement. Thus, the FGPGA 10 provides a gearbox that incorporates at least two high power, high speed gear sets, i.e. the PGS1 12 and the PGS2 14. Additionally, the implementation of high speed face gear in a planetary arrangement allows for off-axes input/output implementations and high input/output gear ratios. Furthermore, utilizing the PGS1 and PGS2 face gears 20, 22, 126 and 128 in a planetary arrangement provides the capability to change the rotational direction of the output and minimizes the number of parts, thereby, significantly reducing the cost of manufacturing and repair of such gearboxes.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A compound face gear planetary gear assembly comprising:
   a first planetary gear set (PGS1) including a plurality of pinion gears, a spur gear connected to an input shaft, a first face gear and a second face gear oriented in a planetary arrangement; and
   a second planetary gear set (PGS2) in a stacked arrangement with the PGS1 such that the PGS1 is oriented within a first plane and the PGS2 is oriented within a second plane substantially parallel to the first plane, the PGS2 having an output shaft associated therewith.

2. The assembly of claim 1, wherein one of the PGS1 pinion gears comprises a spur gear connected to an input shaft.

3. The assembly of claim 2, wherein the PGS1 first face gear and the PGS1 second face gear are adapted to allow the input shaft to have an angular orientation, with respect to an output shaft associated with the PGS2, that is greater than 90°.

4. The assembly of claim 2, wherein the PGS1 first face gear and the PGS1 second face gear are adapted to allow the input shaft to have an angular orientation, with respect to an output shaft associated with the PGS2, that is less than 90°.

5. The assembly of claim 1, wherein the PGS1 first face gear includes a different number of teeth than the PGS1 second face gear such that the output shaft rotates in a clockwise direction.

6. The assembly of claim 1, wherein the PGS1 first face gear includes a different number of teeth than the PGS1 second face gear such that the output shaft rotates in a counter-clockwise direction.

7. The assembly of claim 1, wherein the PGS1 is adapted such that a rotational direction of the output shaft can be altered by changing a tooth differential between the PGS1 first and second face gears absent the use of an idler gear.

8. The assembly of claim 1, wherein the PGS2 includes a plurality of pinion gears, a first face gear and a second face gear oriented in a planetary arrangement.

9. The assembly of claim 8, wherein the PGS2 first face gear includes a different number of teeth than the PGS2 second face gear such that the output shaft rotates in a clockwise direction.

10. The assembly of claim 8, wherein the PGS2 first face gear includes a different number of teeth than the PGS2 second face gear such that the output shaft rotates in a counter-clockwise direction.

11. The assembly of claim 8, wherein the PGS2 is adapted such that a rotational direction of the output shaft can be altered by changing a tooth differential between the PGS2 first and second face gears absent the use of an idler gear.

12. A method for rotating an output shaft of a gearbox, said method comprising:
   orienting a first face gear, a second face gear, a spur gear and a plurality of pinion gears in a planetary arrangement within a first plane of the gearbox to thereby provide a first planetary gear set (PGS1) within the first plane of the gearbox), the spur gear connected to an input shaft;
   orienting a ring gear, a sun gear and a plurality of planet gears in a planetary arrangement within a second plane of the gearbox that is substantially parallel to the first plane to thereby provide a second planetary gear set (PGS2) in a stacked arrangement with the PGS1 within the gearbox;
   connecting to the PGS1 first face gear with the PGS2 ring gear, the PGS1 second face gear with the PGS2 sun gear and the plurality of planet gears to an output carrier connected to the output shaft, and connecting an input shaft to one of the PGS1 pinion gears such that the input shaft has an angular relationship with the output shaft of between approximately 0° and 180°.

13. The method of claim 12, wherein connecting the input shaft comprises providing the PGS1 first face gear and the PGS1 second face gear to have teeth configured to engage teeth of the pinion gear connected to the input shaft such that the input shaft has an angular orientation of between approximately 90° and 180° with respect to the output shaft.

14. The method of claim 12, wherein connecting the input shaft comprises providing the PGS1 first face gear and the PGS1 second face gear to have teeth configured to engage teeth of the pinion gear connected to the input shaft such that the input shaft has an angular orientation of between approximately 0° and 90° with respect to the output shaft.

15. The method of claim 12, wherein orienting PGS1 first and second face gears in a planetary arrangement comprises providing the PGS1 first face gear with a different number of teeth than the PGS1 second face gear such that the output shaft rotates in a clockwise direction.

16. The method of claim 12, wherein orienting PGS1 first and second face gears in a planetary arrangement comprises providing the PGS1 first face gear with a different number of teeth than the PGS1 second face gear such that the output shaft rotates in a counter-clockwise direction.

17. The method of claim 12, wherein orienting PGS1 first and second face gears in a planetary arrangement comprises providing the PGS1 first and second face gears with different tooth counts such that a rotational direction of the output shaft can be altered by changing the tooth differential between the PGS1 first and second face gears absent the use of an idler gear.

18. The method of claim 12, wherein the ring gear comprises a PGS2 first face gear and the sun gear comprises a PGS2 second face gear.

19. The method of claim 18, wherein orienting the ring and sun gears in a planetary arrangement comprises providing the PGS2 first face gear with a different number of teeth than the PGS2 second face gear such that the output shaft rotates in a clockwise direction.

20. The method of claim 18, wherein orienting the ring and sun gears in a planetary arrangement comprises providing the PGS2 first face gear with a different number of teeth than the PGS2 second face gear such that the output shaft rotates in a counter-clockwise direction.

21. The method of claim 18, wherein orienting the ring and sun gears in a planetary arrangement comprises providing the PGS2 first and second face gears with different tooth counts such that a rotational direction of the output shaft can be altered by changing the tooth differential between the PGS2 first and second face gears absent the use of an idler gear.

22. A gearbox comprising:

a high power, high speed compound face gear planetary gear assembly comprising:

a first planetary gear set (PGS1) oriented within a first plane of the gearbox and including a spur gear connected to an input shaft, a plurality of intermediate pinion gears, a first face gear and a second face gear oriented in a planetary arrangement; and a second planetary gear set (PGS2) oriented with a second plane of the gearbox that is substantially parallel with the first plane such that the PGS1 and PGS2 are in a stacked arrangement within the gearbox, the PGS2 including a ring gear, a sun gear and a plurality of planet gears oriented in a planetary arrangement, the planet gears rotationally connected to a carrier coupled to an output shaft;

wherein, the PGS1 first and second face gears are engaged with the spur gear such that the input shaft has an angular relationship with the output shaft of other than 90°, and a rotational direction of the output shaft can be altered by changing a tooth differential between the PGS1 first and second face gears absent the use of an idler gear.

23. The assembly of claim 22, wherein the PGS1 first face gear and the PGS1 second face gear are engaged with the spur gear such that the input shaft has an angular orientation of between approximately 0° and 9020 with respect to the output shaft.

24. The assembly of claim 22, wherein the PGS1 first face gear and the PGS1 second face gear are engaged with the spur gear such that the input shaft has an angular orientation of between approximately 90° and 180° with respect to the output shaft.

25. The assembly of claim 22, wherein the ring gear comprises a PGS2 first face gear and the sun gear comprises a PGS2 second face gear.

26. The assembly of claim 25, wherein the PGS2 is adapted such that a rotational direction of the output shaft can be altered by changing a tooth differential between the PGS2 first and second face gears absent the use of an idler gear.

* * * * *